No. 782,727. PATENTED FEB. 14, 1905.
R. S. CUTTER.
WHEEL.
APPLICATION FILED AUG. 17, 1903.
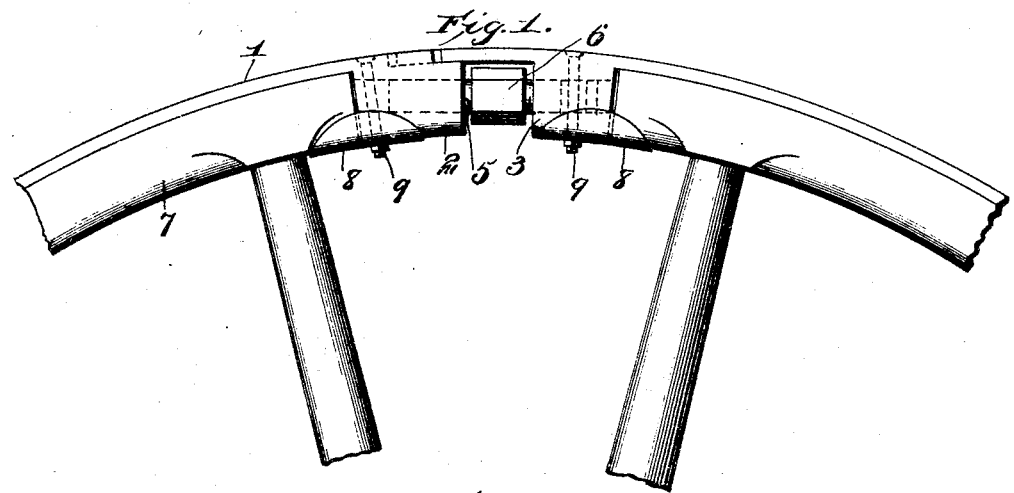
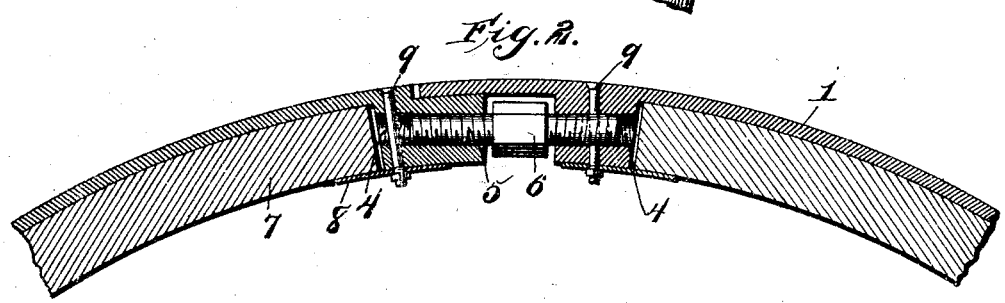
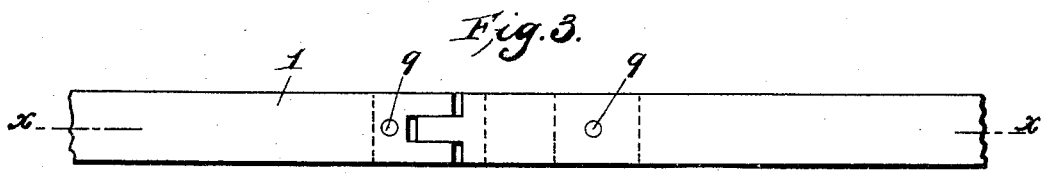
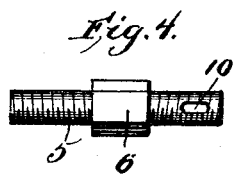
WITNESSES:
Louis D. Heinrichs
Joseph W. Burll
INVENTOR
Richard S. Cutter
BY Hugh M. Sterling
Attorney No. 782,727. Patented February 14, 1905.

UNITED STATES PATENT OFFICE.

RICHARD SAMUEL CUTTER, OF OCHILTREE, TEXAS.

WHEEL.

SPECIFICATION forming part of Letters Patent No. 782,727, dated February 14, 1905.

Application filed August 17, 1903. Serial No. 169,733.

*To all whom it may concern:*

Be it known that I, RICHARD SAMUEL CUTTER, a citizen of the United States, residing at Ochiltree, in the county of Ochiltree and State of Texas, have invented new and useful Improvements in Wheels, of which the following is a specification.

This invention relates to improvements in that class of wheels having adjustable means forming a part of the tire by which the tire is adapted to be applied to the wheel and subsequently tightened thereon or tightened from time to time as the shrinkage of the wheel may require.

The object of the invention has been to produce a practical and effective wheel of this character having a tire that can be readily applied to or removed from the wheel without requiring the adjustment to be disturbed except for tightening and that can be adjusted without causing the usual straining of the wheel, which neutralizes the tightening operation, in consequence of which such tightening devices are rendered less effective, and, moreover, require provision to be made for an amount of adjusting that is detrimental to practical results.

Further, the invention aims to provide for locking the tire in such a manner as to maintain it in its adjustment against accidental displacements or from the usual tendency of adjusting-bolts to work loose.

The invention therefore consists in certain novel features in the arrangement and construction of parts, as hereinafter described, and specified in the appended claims.

In the accompanying drawings, Figure 1 is a side elevation of a section of a wheel, showing the application of the invention; Fig. 2, a section view taken on the line *x x* of Fig. 3; Fig. 3, a top or plan view of the section of wheel shown, and Fig. 4 a view of the adjusting-bolt detached.

Referring to the drawings, 1 indicates a severed tire having its terminals provided with the lugs 2 and 3, respectively, which are provided with a screw-threaded bore 4 to receive the usual right and left hand screw-threaded adjusting and tightening bolt 5, having the turning-nut 6 thereon. The terminals are cut to form a tenon-joint, as shown in Fig. 3, to prevent disalinement thereof and produce a strong construction, and the lug 2 is so located as to form a seat for the tenon and also projects beyond the end of its terminal to form a bearing for the opposite terminal of the tire. These lugs are of a form in cross-section to correspond to the felly 7, a section of the felly being removed to receive them, and they present an abutting face to the ends of the felly, which is designed to admit of an initial fitting of the tire, with the felly and lugs in firm contact, so that the slight adjustment that may be required subsequently will not space these members apart to such an extent that it will be necessary to provide securing means for the ends other than the clips 8, which are removably carried by the lugs, being secured thereto by bolts 9. By this manner of securing the ends of the felly the approaching movement imparted to the lugs in tightening the tire will not tend to neutralize the tightening operation, which result occurs when the ends of the felly are connected with the tire, and, moreover, by this arrangement the ends of the felly are not injured, as when a recess is provided in each to receive the ends of the tightening-bolt, such arrangement also necessitating disadjusting the tire to remove the same, while by the provision shown of increasing the length of the lugs not only are the ends of the bolts made incapable of projecting, but a more durable union of the parts is effected, the undue use of metal being provided against by the formation of a comparatively large bore through the lug and the use of a bolt of corresponding size.

The lug 3 from its position and function is shorter than the lug 2, and by employing the clip-bolt 9 as a lock by passing it through a slot 10 forms within the adjusting-bolt adjacent one end to register with the whole for said clip-bolt, provision is made for retaining the present form of clip-fastening without requiring the objectionable lengthening of the lug, while a simple and effective lock is provided for maintaining the adjusting-bolt in adjusted position.

From the foregoing it will be seen that a simple form of device has been produced that is efficient and practical principally for the reason that but slight adjusting operation is required and the parts securely locked against movement.

Having thus fully described my invention, what I claim, and desire to secure by Letters Patent, is—

1. In a wheel the combination with the felly, of a severed tire having the terminals thereof provided with lugs, an adjusting-bolt having right and left hand screw-threaded bearings in said lugs, and a bolt passing through one of said lugs and in engagement with said adjusting-bolt, substantially as and for the purpose set forth.

2. In a wheel the combination with the felly, of a severed tire having the terminals thereof provided each with a lug, an adjusting-bolt having a slot formed therein, and having right and left hand screw-threaded bearings in said lugs, a clip adapted to embrace the lug and felly, and an attaching-bolt for said clip passing through one of said lugs and through the slot of the adjusting-bolt, substantially as and for the purpose set forth.

In testimony whereof I have signed my name to this specification in the presence of two subscribing witnesses.

RICHARD SAMUEL CUTTER.

Witnesses:
WM. MCMILLEN,
J. W. WRIGHT.